United States Patent
Piwowarski et al.

(10) Patent No.: US 7,738,509 B2
(45) Date of Patent: Jun. 15, 2010

(54) METHOD AND SYSTEM FOR INBAND EMERGENCY NOTIFICATION FOR VOICE CALLS

(75) Inventors: James J. Piwowarski, Holly, MI (US); John L. Dale, Fenton, MI (US); Gregory B. Stewart, Northville, MI (US)

(73) Assignee: General Motors LLC, Detroit, MI (US)

( * ) Notice: Subject to any disclaimer, the term of this patent is extended or adjusted under 35 U.S.C. 154(b) by 2177 days.

(21) Appl. No.: 10/330,908

(22) Filed: Dec. 27, 2002

(65) Prior Publication Data
US 2004/0125764 A1    Jul. 1, 2004

(51) Int. Cl.
- H04J 3/00 (2006.01)
- B60Q 1/00 (2006.01)
- H04M 11/04 (2006.01)

(52) U.S. Cl. .................... 370/529; 340/425.5; 379/45

(58) Field of Classification Search .............. None
See application file for complete search history.

(56) References Cited

U.S. PATENT DOCUMENTS

| | | | |
|---|---|---|---|
| 5,245,694 A * | 9/1993 | Zwern | 704/200 |
| 5,687,215 A * | 11/1997 | Timm et al. | 455/404.2 |
| 6,310,543 B1 * | 10/2001 | Yoshioka et al. | 340/436 |
| 6,377,165 B1 * | 4/2002 | Yoshioka et al. | 340/425.5 |
| 6,519,463 B2 | 2/2003 | Tendler | |
| 6,756,917 B2 * | 6/2004 | Gould et al. | 340/988 |
| 7,050,818 B2 | 5/2006 | Tendler | |
| 7,395,045 B2 * | 7/2008 | Jijina et al. | 455/404.1 |
| 2002/0093924 A1 * | 7/2002 | Preston et al. | 370/328 |
| 2003/0112141 A1 * | 6/2003 | Arunkumar | 340/539.18 |
| 2004/0198312 A1 * | 10/2004 | Jarett | 455/404.1 |
| 2004/0198366 A1 * | 10/2004 | Crocker et al. | 455/452.1 |
| 2004/0203569 A1 * | 10/2004 | Jijina et al. | 455/404.1 |
| 2004/0203672 A1 | 10/2004 | Crocker et al. | |
| 2004/0203864 A1 * | 10/2004 | DiBuduo | 455/456.1 |
| 2005/0090236 A1 | 4/2005 | Schwinke et al. | |
| 2005/0186941 A1 | 8/2005 | Gault et al. | |

\* cited by examiner

*Primary Examiner*—Chi H Pham
*Assistant Examiner*—Warner Wong

(57) ABSTRACT

The invention provides a method for inband emergency notification for voice calls by multiplexing at least one emergency signal within an audible data stream and transmitting the audible data stream from a telematic communication unit to a mobile vehicle communication system. The mobile vehicle communication system decodes the emergency signal from the audible data stream and provides an emergency service as a function of the emergency signal.

12 Claims, 3 Drawing Sheets

METHOD AND SYSTEM FOR INBAND EMERGENCY NOTIFICATION FOR VOICE CALLS

FIELD OF THE INVENTION

In general, the invention relates to communication networks. More specifically, the invention relates to audible transmissions within a wireless communication network and in particular, to a method and system for transmitting an emergency signal and associated information from a wireless communication unit.

BACKGROUND OF THE INVENTION

Telematic communication units (TCUs), such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and facsimile (FAX) messages from virtually anywhere on earth. Such communication is initiated at the TCU when it is turned on, or by entering a phone number to be called, or in many cases, by pressing a preprogrammed button on the TCU or speaking a voice command causing the TCU to automatically complete the process of dialing the number to be called. A radio communication link is established between the TCU and a Wide Area Network (WAN), using a node of the WAN near the TCU. In cellular telephone systems, a node is commonly referred to as a "cellular base station" of a "wireless service provider". Once the radio communication link between the TCU and the cellular base station has been established, the base station may utilize a combination of additional cellular stations, conventional telephone wire line networks, and possibly even satellite systems to connect the TCU to the requested number or service.

Wireless communication services, such as navigation and roadside assistance for TCU users, have greatly increased in recent years. More specialized services are now offered for VCU users, and may aid motor vehicle operations and include services that provide location, destination, and emergency information. Emergency assistance may include an emergency ambulance service that is initiated if a TCU vehicle is involved in an accident and the driver does not respond to a voice request after the accident.

Existing telematics systems have limitations when attempting to handle emergency/collision requests. Currently, telematics system hardware attempts to complete an emergency/collision call in a data mode. If the attempt fails, the hardware will attempt to initiate a fail-to-voice (FTV) call. The FTV call is initiated knowing that the elimination of data exchange increases the likelihood of reaching the wireless service provider.

Despite the benefits of making a FTV call, disadvantages remain. Due to the lack of data exchange, the need for (or lack of) emergency services by FTV must be ascertained through verbal communications with the customer. Unfortunately, the ability for this verbal communications to occur can be compromised by audio or microphone systems damaged during collision, customer inability to communicate due to injuries, or microphone unavailable due to lack of power based on vehicle architecture. In the case of a loss of verbal communication, it will appear that the customer is not on the line and the service provider may terminate the call without the knowledge that an emergency condition exists.

Thus, there is a significant need for a method and system for providing inband emergency notification for wireless audible communication that overcome the above disadvantages and shortcomings, as well as other disadvantages.

SUMMARY OF THE INVENTION

One aspect of the invention provides an inband audible emergency notification method for multiplexing at least one emergency signal within an audible data stream and transmitting the audible data stream from a telematic communication unit to a mobile vehicle communication system. Inband notification consists of a combination of control and data simultaneously or sequentially issued over a single communications channel. The method continues by decoding the emergency signal from the audible data stream and providing an emergency service as a function of the emergency signal.

Another aspect of the invention provides a system for decoding the emergency signal from the audible data stream and means for providing an emergency service as a function of the emergency signal.

Another aspect of the invention provides a computer readable medium for storing a computer program. The computer program is comprised of computer readable code for multiplexing at least one emergency signal within an audible data stream, computer readable code for transmitting the audible data stream from a telematic communication unit to a mobile vehicle communication system, computer readable code for decoding the emergency signal from the audible data stream, and computer readable code for providing an emergency service as a function of the emergency signal.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
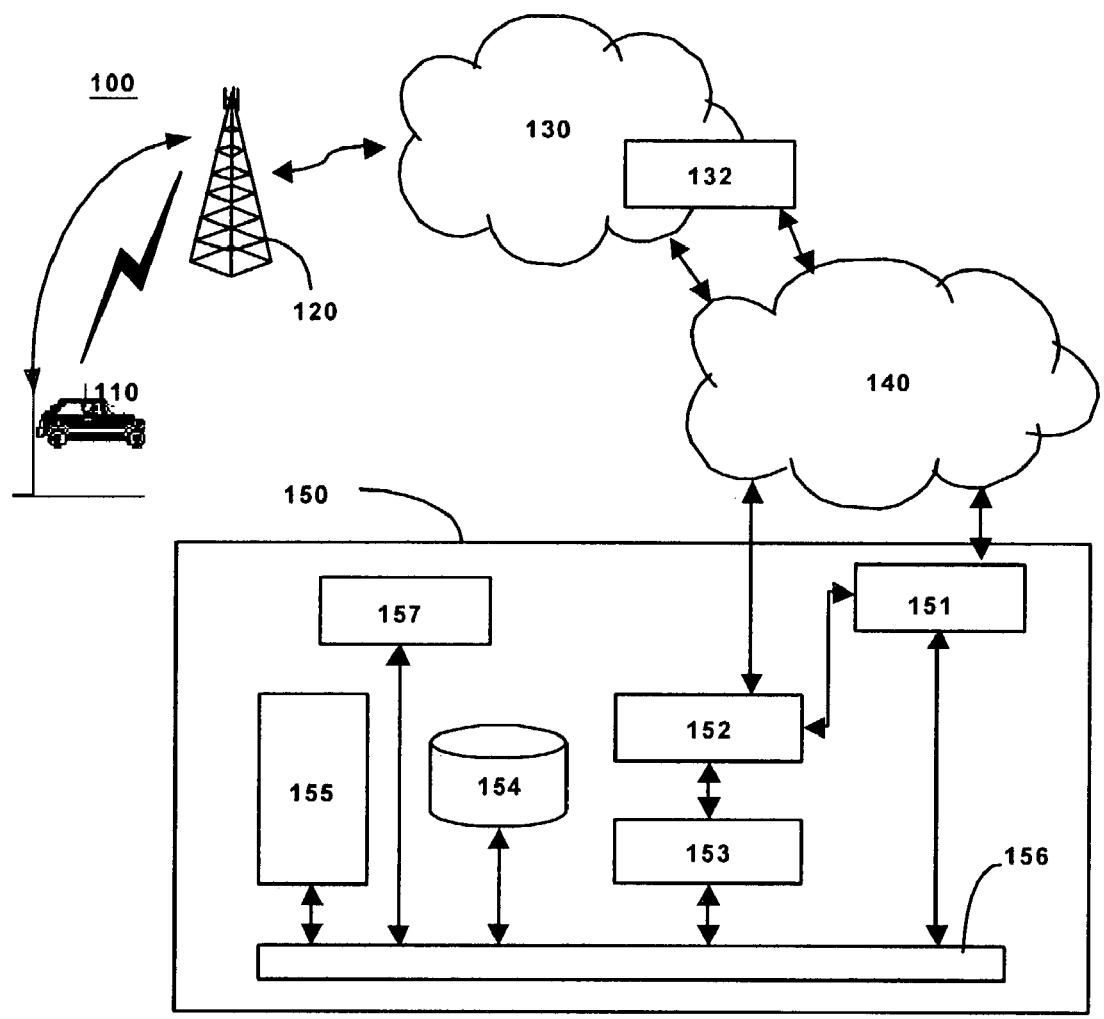
FIG. 1 is a schematic diagram for one embodiment of a system for accessing a mobile vehicle using a wireless communication system, in accordance with the current invention.

FIG. 1 shows an illustration of one embodiment of a system for communicating with a mobile vehicle using a wireless communication system in accordance with the present invention, and may be referred to as a mobile vehicle communication system (MVCS) 100. The mobile vehicle communication system 100 may contain one or more mobile vehicles (mobile vehicle communication unit, MVCU) 110, one or more wireless carrier systems (wireless service providers) 120, one or more communication networks 130, one or more short message service centers 132, one or more land networks 140, and one or more call centers 150. One embodiment of the call center 150 contains one or more switches 151, one or more data transmission devices 152, one or more communication services managers 153, one or more communication services databases 154, one or more advisors 155, one or more bus systems 156, and one or more automated speech recognition (ASR) units 157. The term "data" throughout the detailed description may refer to at least one datum, or a multitude of data.

MVCU (mobile vehicle) 110 includes a wireless vehicle communication device (module, MVCS module, telematic communication unit (TCU)) such as an analog or digital phone with suitable hardware and software for transmitting and receiving data communications, and/or an on-board vehicle communication unit (VCU). In one embodiment, MVCU 110 further includes a wireless modem for transmitting and receiving data. In another embodiment, MVCU 110 includes a digital signal processor with software and additional hardware to enable communications with the mobile vehicle and to perform other routine and requested services.

Additionally, MVCU 110 includes a global positioning system (GPS) unit capable of determining synchronized time and a geophysical location of the mobile vehicle. In operation, MVCU 110 sends to and receives radio transmissions from wireless carrier system 120. MVCU 110 may also be referred to as a mobile vehicle throughout the discussion below. In operation, MVCU 110 may be implemented as a motor vehicle, a marine vehicle, or as an aircraft.). In another embodiment, MVCU 110 may include a foreign global positioning system, such as, for example, the Russian Global Navigation Satellite System (GLONASS).

In a further embodiment, MVCU 110 contains a speech recognition system (ASR) capable of communicating with the wireless vehicle communication device and VCU, and contains a voice recognition engine (VRE) capable of word recognition. In yet another embodiment, the MVCS module further includes an audio speaker, a synthesized voice output, an audio channel, or the like. In an example, a MVCS module is implemented, in addition to the receiver, as a set of headphones, the audio portion of a television, a display device, or the like. Further, the VCU is capable of functioning as one or more of the above communication devices and, for one embodiment of the invention, includes at least one function from the list of data storage, data retrieval, receiving data queries, processing data queries, and transmitting data queries.

Wireless carrier system 120 is a wireless communications carrier or a mobile telephone system and transmits to and receives signals from one or more MVCU 110. In one example, the mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications.

A further embodiment of the MVCS 100 provides the wireless carrier system 120 to be connected with communications network 130. One example of the communications network 130 contains a mobile switching center and provides services from one or more wireless communications companies.

Another embodiment of the MVCS 100 allows for communications network 130 to be any suitable system or collection of systems for connecting wireless carrier system 120 to at least one mobile vehicle 110 or to a call center.

Communications network 130 includes one or more short message service centers 132. Short message service center 132 is capable of prescribing alphanumeric short messages to and from mobile vehicles 110, and includes message entry features, administrative controls, and message transmission capabilities. For one embodiment of the invention, the short message service center 132 includes one or more automated speech recognition (ASR) units. Another example of the short message service center 132 stores and buffers the messages, and includes functional services (short message services) such as paging, text messaging and message waiting notification. An example of the short message services includes telematic services such as broadcast services, time-driven message delivery, autonomous message delivery, and database-driven information services. Another example of the short message services includes message management features, such as message priority levels, service categories, expiration dates, cancellations, and status checks.

A public-switched telephone network is one example of the land network 140, and contains at lease one wired network, optical network, fiber network, wireless network, or any combination thereof. Another example of the land network 140 is in communication with an Internet protocol (IP) network. A further example of the land network 140 connects the communications network 130 to a call center. Yet another example of the land network 140 connects a first wireless carrier system 120 with a second wireless carrier system 120, and also connects wireless carrier system 120 to a communication node or call center 150 with the use of the communication network 130. In another embodiment of the invention, a communication system references all or part of the wireless carrier system 120, communications network 130, land network 140, and short message service center 132.

Call center 150 is a location where many calls can be received and serviced at the same time, or where many calls may be sent at the same time. Example call centers are telematic call centers, prescribing communications to and from mobile vehicles 110, voice call centers, providing verbal communications between an advisor in the call center and a subscriber in a mobile vehicle, and voice activated call centers, providing verbal communications between an ASR unit and a subscriber in a mobile vehicle. The call center may contain any combination of hardware or software facilitating data transmissions between call center 150 and mobile vehicle 110. A further embodiment of the invention provides that the call center contains any of the previously described functions. A further embodiment of the invention includes at least one third party service provider as a service, function, hardware, network, or business that is not part of the MVCS 100.

One embodiment of the call center contains switch 151. Switch 151 is connected to land network 140, and receives a modem signal from an analog modem or from a digital modem. Switch 151 transmits voice or data transmission from the communication node. Another embodiment of switch 151 can receive voice or data transmissions from mobile vehicle 110 through wireless carrier system 120, communications network 130, and land network 140, and can receive from or send data transmissions to data transmission device 152. A further embodiment of switch 151 can receive from or send voice transmissions to advisor 155 via bus system 156. Switch 151 can receive from or send voice transmissions to one or more automated speech recognition (ASR) units 157 via bus system 156.

Data transmission device 152 sends or receives data from switch 151. An example data transmission device 152 is an IP router or a modem. Data transmission device 152 transfers data to or from advisor 155, one or more communication services managers 153, one or more communication services databases 154, one or more automated speech recognition (ASR) units 157, and any other device connected to bus system 156. Another example of data transmission device 152 conveys information received from short message service center 132 in communication network 130 to communication services manager 153.

The communication services manager 153 is connected to switch 151, data transmission device 152, and advisor 155 through bus system 156. Another embodiment of the communication services manager 153 receives information from mobile vehicle 110 through wireless carrier system 120, short message service center 132 in communication network 130, land network 140, and data transmission device 152. Additionally, an embodiment of communication services manager 153 sends information to mobile vehicle 110 through data transmission device 152, land network 140, communication network 130 and wireless carrier system 120. Further embodiments of the communication services manager 153 send short message service messages via short message service center 132 to the mobile vehicle, receive short message service replies from mobile vehicle 110 via short message service center 132, send short message service requests to mobile vehicle 110, and receive from or send voice transmissions to one or more automated speech recognition (ASR) units 157.

In another embodiment of the invention, short message service (SMS) communications are sent and received according to established standards. Similar to paging, an SMS communication may be posted along with an intended recipient, such as a communication device in mobile vehicle 110. The SMS communication is be sent by a communication services manager 153 in the call center 150, transferred to a short message service center (SMSC), and conveyed to the intended recipient.

Communication services database 154 contains records on one or more mobile vehicles 110, with a portion of communication services database 154 dedicated to short message services. Records in communication services database 154 may include vehicle identification, location information, diagnostic information, status information, recent action information, and vehicle passenger (user, customer) and operator (user, customer) defined preset conditions regarding mobile vehicle 110 and any of the communication services. Another embodiment of the invention requires that communication services database 154 provide information and other support to communication services manager 153 and automated speech recognition (ASR) units 157, and to external VRE services. External services (VRE services) can be for example, emergency services, vehicle repair services, rental agencies, marketing firms, manufacturers, and wireless carriers.

Examples of advisor 155 are real advisors and virtual advisors. A real advisor is a human being in verbal communication with mobile communication device 110. A virtual advisor is a synthesized voice interface responding to requests from mobile communication device 110. Advisor 155 provides services to mobile communication device 110, and can communicate with communication services manager 153, automated speech recognition (ASR) units 157, or any other device connected to bus system 156 or mobile communication device 110. Another embodiment of the invention may allow for the advisor 155 and ASR units 157 to be integrated as a single unit capable of any features described for either.

Figure 2:
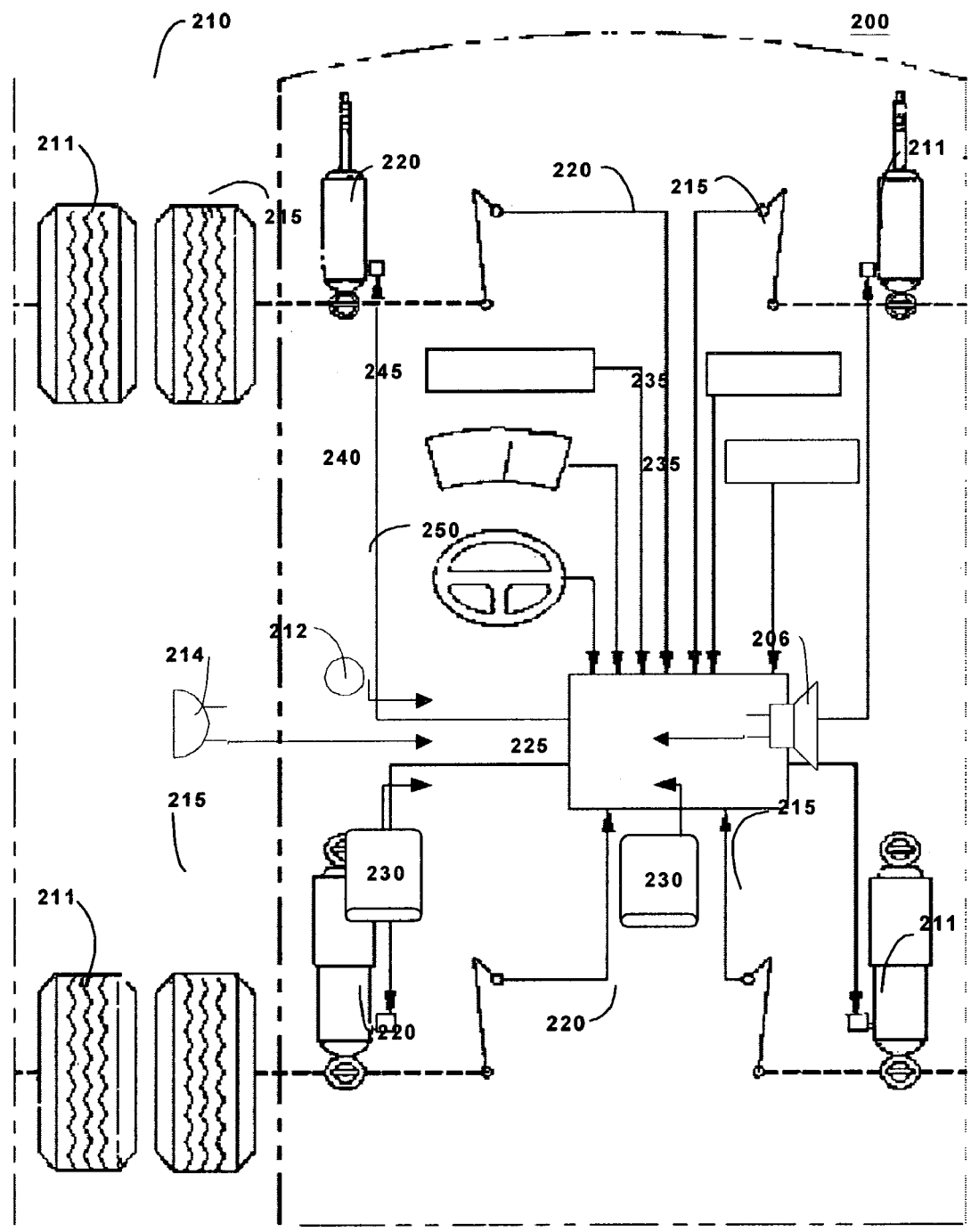
FIG. 2 is a schematic view for one embodiment of a vehicle utilizing the systems of FIG. 1 in accordance with the present invention.

FIG. 2 illustrates one embodiment of the invention as an example mobile vehicle (vehicle) 200, and may utilize one or more embodiments previously detailed. For one embodiment of the invention, the vehicle 200 may be comprised of a vehicle body 210 supported by four wheels 211 and by four suspension devices 215 including springs (not shown), all of a type known in the art.

Each corner of the vehicle may include a linear position sensor 220 that may relate specific settings specifying the allowable relative distance between the vehicle wheel and the suspended vehicle body for each corner of the vehicle 200. Suitable position sensors. 220 can be easily constructed by those skilled in the art and any type of position sensor known in the art may be used.

The vehicle 200 may include a system for vehicle incident data storage similar to an aeronautical black box and may be in communication or part of a TCU 225, which may contain or be in contact with pc cards, peripheral equipment, additional sensors, and connectors, as are known in the art. The TCU 225 may be capable of collecting vehicle operational and incidental data, and provide the means for interactivity and expandability of the data storage system. It may be fastened within the vehicle 200 in a permanent manner, or it may be made in a non-descriptive fashion capable of being stealth. Additionally, vehicle data provided by further equipment and sensors 235 may be received and applied to the TCU 225. An in-vehicle audio system 206 may connect to the TCU 225 and may contain an audio bus, a radio, and a speaker. The in-vehicle audio system 206 may provide verbal communication from outside the vehicle using the TCU 225. A microphone 214 may be connected to the TCU for communications between the vehicle and any external elements of the mobile vehicle communication system.

Another embodiment of the invention may provide that the vehicle 200 have multiple sensors 235 for speed 240, steering 250, seat configuration 230, etc. for the purpose of incident detection. An incident may include activities related to crash, fire, medical, and criminal actions. The vehicle incident data storage system may also include data analysis 245, video/imaging, acoustic evaluation, wireless communication, and biometric storage and evaluation. In case of any incidents, a button assembly 212 containing at least one button may be in communication with the customer and the TCU 225 and when pressed, initiates an emergency call.

The above equipment and features, in part or in combination, may be used within the MVCS to determine the presence of an incident involving the vehicle 200 or one of its occupants that may require emergency services.

Figure 3:
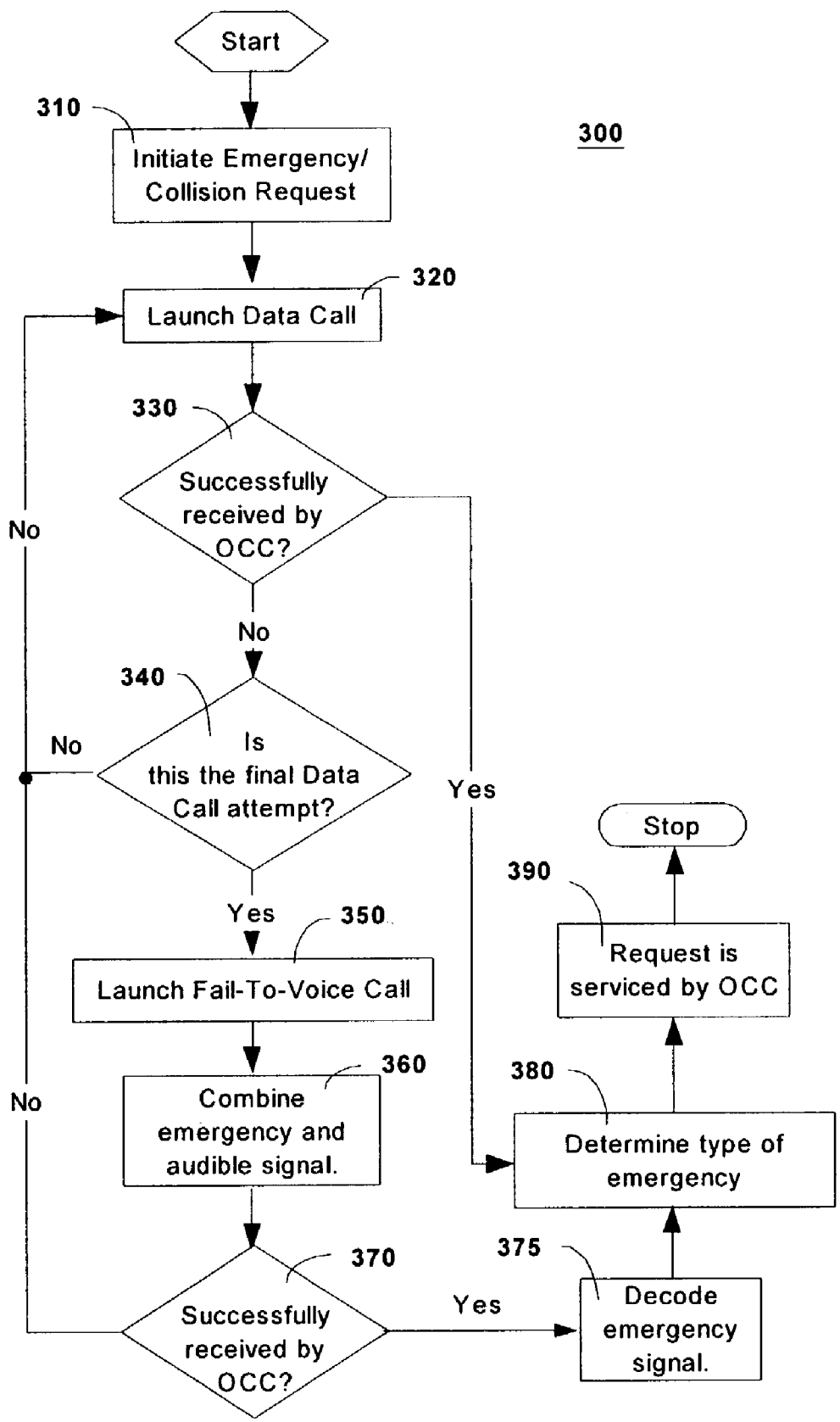
FIG. 3 is a flow chart representation for one embodiment of a method for inband emergency notification for voice calls utilizing the embodiments of FIG. 1, FIG. 2 in accordance with the present invention.

FIG. 3 is a flow chart representation for one embodiment of a method 300 for transmitting an emergency signal and associated information from a wireless communication unit, utilizing one or more of the systems previously described in accordance with the present invention. This method is used to prevent calls from appearing abandoned and being ended by a call center advisor. The method 300 begins when an emergency request is initiated from a TCU 310 by either a customer or automatically by the vehicle. The request may be initiated, for example, by an audible request from the customer using the ASR unit, by pushing an emergency button or touchpad, or by sensors located within the car. A data call, as is known in the art, is transmitted from the TCU to the call center 320. If the transmission is successfully received by the call center 330, the emergency request is processed by a call center operator (OCC) 380, who determines the nature of the emergency and provides emergency services 390 as necessary. If the data call transmission is not successfully received 330, a determination is made if this is the last data call attempt 340 by referencing a data call counter. If this is not the last data call attempt 340, a new data call transmission is launched 320, and the data call counter is incremented by one. The data call counter may be software or hardware based, and is preset to a defined number that once reached 340, will allow for the generation of a fail-to-voice call (FTV) 350. Before the fail-to-voice call 350 is sent (transmitted), an embodiment of the invention calls for the TCU hardware or software to provide at least one emergency signal 360 to be combined (multiplexed) with an audible data stream. One embodiment of the emergency signal 360 provides an inband, audible indication that an emergency/collision situation exists, while maintaining voice communications for FTV calls through multiplexing. A further embodiment of the invention provides that the audible indication from the emergency signal 360 can be a tone, message, or both of optimal content and cycle.

If the FTV transmission is not successfully received by the call center (OCC) 370, a new data call transmission is launched 320, and a new data call counter is incremented by one. If the FTV transmission is successfully received by the call center 370, the multiplexed signal is decoded 375 to provide the original emergency signal and the FTV call. Upon receipt of the decoded emergency notification tone and FTV call 380, the OCC can determine if an emergency/collision condition exists, pull the vehicle location, and provide the appropriate services 390, without verbal communications with the customer. With this invention, MVCS service providers can supply critical emergency services during FTV or voice call attempts.

The above described methods and implementation for transmitting an emergency signal and associated information from a TCU are example methods and implementations. These methods and implementations illustrate one possible approach for encoding, creating, and decoding an FTV call from a TCU, peripheral, and/or mobile vehicle, and their associated devices. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

We claim:

1. A method for providing an emergency notification from a mobile vehicle communication unit to a remote human operator at a call center, comprising:
    detecting an emergency event at the vehicle, and attempting to place a data call to the call center;
    in response to detecting that the attempt to place the data call has failed;
    generating a human audible and human understandable emergency signal;
    placing a voice call to the call center;
    multiplexing the emergency signal within an audible data stream in the voice call;
    transmitting the multiplexed audible data stream from the vehicle to the call center;
    decoding the audible emergency signal from the audible data stream; and
    audibly reproducing the extracted emergency signal to the human operator.

2. The method of claim 1 further comprising, initiating an over-the-air session between the communication unit and a third party service provider.

3. The method of claim 1 further comprising providing the emergency signal as a function of an emergency detection device in communication with the communication unit.

4. The method of claim 1 further comprising initiating the emergency signal as a function of a customer controlled button.

5. A system for vehicular inband audible emergency notification comprising:
    a data center;
    a vehicle with an emergency condition;
    means for detecting an emergency condition with respect to the vehicle;
    means for attempting to place a data call to the call center, and in response to detecting that the data call failed;
    means for placing a voice call to the call center to send an audible data stream to the call center and for multiplexing at least one human audible emergency signal within the audible data stream; and
    means for decoding the emergency signal from the audible data stream and audibly playing both the audible data stream and the human audible emergency signal at the call center.

6. The system of claim 5 further comprising means for initiating an over-the-air session between the vehicle and a third party service provider.

7. The system of claim 5 further comprising means for providing the emergency signal as a function of an emergency detection device in the vehicle.

8. The system of claim 5 further comprising means for initiating the emergency signal as a function of a customer controlled button.

9. A non-transitory computer readable medium having stored thereon computer executable instructions for producing an emergency notification associated with an emergency event at a vehicle, the instructions comprising instructions for:
    attempting to place a data call to a call center, detecting a failure of the data call, and responsively placing a voice call to the data center;
    generating an audible emergency notification and creating a multiplexed signal including voice data and the audible emergency notification;
    transmitting the multiplexed signal to a call center;
    decoding the audible emergency notification from the multiplexed signal; and
    audibly reproducing the audible emergency notification at the call center.

10. The computer readable medium of claim 9, the computer executable instructions for generating an audible emergency notification further comprising instructions for initiating a second over-the-air session between the vehicle and a third party service provider.

11. The computer readable medium of claim 9, wherein the audible emergency notification is provided as a function of an emergency detection device in the vehicle.

12. The computer readable medium of claim 9, further comprising instructions for initiating the emergency signal as a function of a customer controlled button.

* * * * *